(12) United States Patent
Fukagawa et al.

(10) Patent No.: US 8,400,357 B2
(45) Date of Patent: Mar. 19, 2013

(54) RADIO ARRIVAL DIRECTION ESTIMATION DEVICE AND RADIO ARRIVAL DIRECTION ESTIMATION METHOD

(75) Inventors: Takashi Fukagawa, Kanagawa (JP); Yoichi Nakagawa, Tokyo (JP); Hirohito Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 13/056,825

(22) PCT Filed: Sep. 4, 2009

(86) PCT No.: PCT/JP2009/004396
§ 371 (c)(1),
(2), (4) Date: Jan. 31, 2011

(87) PCT Pub. No.: WO2010/038359
PCT Pub. Date: Apr. 8, 2010

(65) Prior Publication Data
US 2011/0133988 A1   Jun. 9, 2011

(30) Foreign Application Priority Data

Sep. 30, 2008 (JP) ................................. 2008-253659
May 13, 2009 (JP) ................................. 2009-116829

(51) Int. Cl.
*G01S 5/02* (2010.01)
(52) U.S. Cl. ....................................................... 342/423
(58) Field of Classification Search .................... 342/423
See application file for complete search history.

(56) References Cited

U.S. PATENT DOCUMENTS

| | | | |
|---|---|---|---|
| 2008/0012765 A1 | 1/2008 | Xu et al. | |
| 2008/0204322 A1 | 8/2008 | Oswald et al. | |
| 2009/0002165 A1* | 1/2009 | Tuttle | 340/572.1 |

FOREIGN PATENT DOCUMENTS

| | | |
|---|---|---|
| JP | 2006-105723 | 4/2006 |
| JP | 2007-518968 | 7/2007 |
| JP | 2008-008887 | 1/2008 |
| JP | 2008-045954 | 2/2008 |

OTHER PUBLICATIONS

International Search Report dated Oct. 6, 2009.

(Continued)

*Primary Examiner* — Harry Liu
(74) *Attorney, Agent, or Firm* — Dickinson Wright PLLC

(57) ABSTRACT

A radio arrival direction estimation device that accurately estimates the arrival direction of radio waves from a desired tag, even when there are multiple antennas disposed at short intervals. When ID detection timing is provided from a timing detector (114) to a switch (201), relative amplitude/phase data related to the tag ID digital value "1" or "0" is obtained by an arrival direction estimation unit (125). One relative amplitude/phase datum is formed for each unit cycle in a first adder (202), which adds the relative amplitude/phase datum related to the tag ID digital value "1" to each element in a matrix, and a second adder (203), which adds the relative amplitude/phase datum related to the tag ID digital value "0" to each element in a matrix. An OOK signal causes an arithmetic unit (204) to subtract the relative amplitude/phase data produced by the second adder (203) from the relative amplitude/phase data produced by the first adder (202), and extract the phase of a signal corresponding to the phase of the digital value "1."

9 Claims, 11 Drawing Sheets

OTHER PUBLICATIONS

N. Kikuma, "Adaptive Signal Processing by Array Antenna," Kagaku Gijutsu Shuppan, Inc, Nov. 1998, 1 page with 2 page partial English translation, p. 2, Line 23.

M. Haneishi, "Latest Planar Antenna Technology," Sogo Gijutsu Center, Mar. 1993, pp. 319-320 and 1 page partial English translation, p. 2, Line 26.

\* cited by examiner

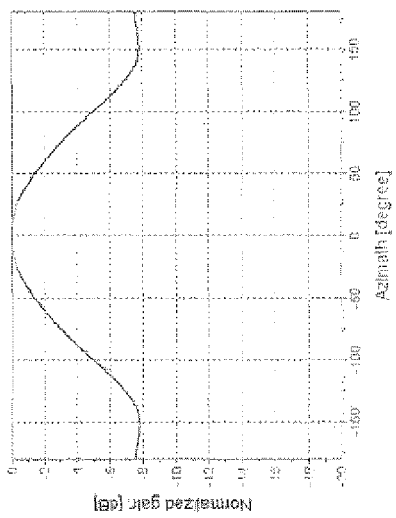
FIG.9A
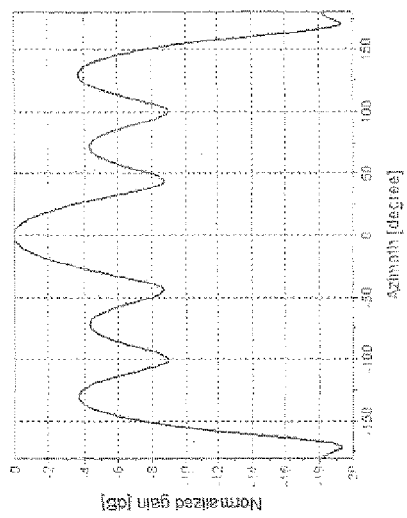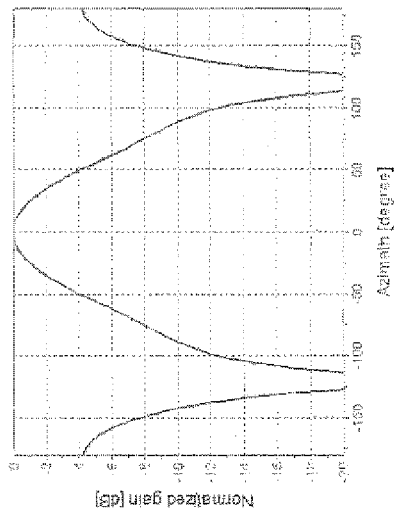
FIG.9B
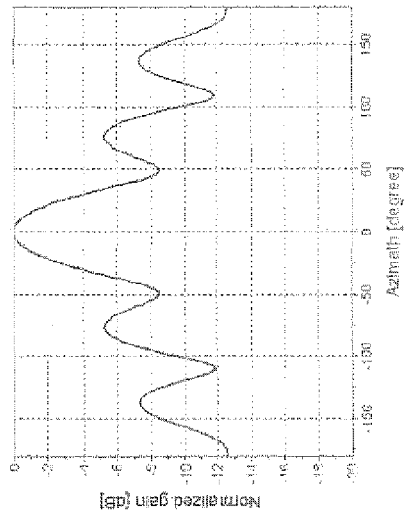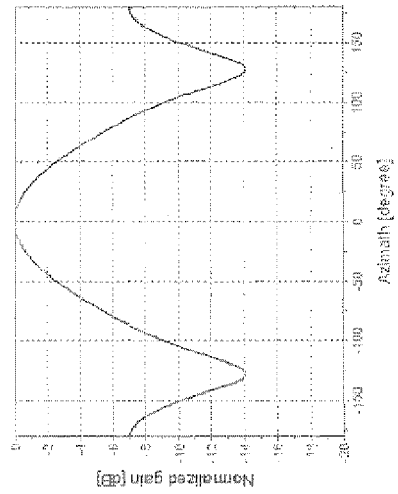
FIG.9C
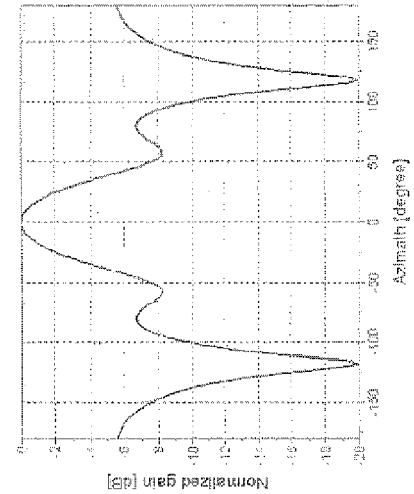
FIG.9D
FIG.9E
FIG.9F

RADIO ARRIVAL DIRECTION ESTIMATION DEVICE AND RADIO ARRIVAL DIRECTION ESTIMATION METHOD

TECHNICAL FIELD

The present invention relates to a radio arrival direction estimating apparatus and radio arrival direction estimating method for estimating the radio arrival direction of a specific tag.

BACKGROUND ART

In UWB (Ultra Wide Band) radio, accurate ranging using the wideband characteristic is possible. For example, the IEEE802.15.4a standard discloses a four-point ranging method and a ranging method by measuring roundtrip time. Also, as a method of measuring the position of a tag, there is a method of measuring a tag position by combining the above ranging result and a technique of estimating the azimuth where the tag is present as the radio wave arrival direction, and, in principle, the tag position is obtained from the principle of polar coordinates.

As a literature encompassing arrival direction estimating techniques of radio waves, for example, there is Non-Patent Literature 1. As shown in Non-Patent Literature 1, there are a beam sweep, null sweep (e.g. Capon method) and a method (e.g. MUSIC method) of determining a correlation matrix or covariance matrix from signals obtained by array antennas and calculating an eigenvector using the determined matrix.

However, actual pulses of IR-UWB (Impulse Response-UWB) have a wider band than a narrowband signal or carrier wave supposed in Non-Patent Literature 1, its frequency characteristic has many errors between general array element systems, and, consequently, large error occurs if the above methods are used.

By contrast with this, as a radio arrival direction estimating apparatus using UWB, for example, Patent Literature 1 discloses an apparatus that has a plurality of distance measurement units and that estimates the radio wave arrival direction using the arrival time difference of radio waves from a tag.

FIG. 1 shows a configuration of array antenna 10 having reception units (antenna elements) 11 to 14. Array antenna 10 calculates the azimuth of an object using the difference of timing a signal reflected from the object arrives at each reception unit.

CITATION LIST

Patent Literature

[PTL 1]
Japanese Translation of PCT Application Publication No. 2007-518968

Non-Patent Literature

[NPL 1]
Nobuyuki Kikuma, "Adaptive Signal Processing Using Array Antennas", Kagaku Gijutsu Syuppan, 1998
[NPL 2]
Misao Haneishi, "Latest Planar Antenna Technique", Sogo Gijutsu Center Co., Ltd, pages 319 and 320

SUMMARY OF INVENTION

Technical Problem

However, with the configuration shown in above Patent Literature 1, although it is possible to find an accurate angle of the radio wave arrival direction if four reception units are placed in positions far from each other, it is difficult to find an accurate angle of the radio wave arrival direction if these reception units are placed in positions close to each other. This is because the time difference of timing each reception unit receives a signal is very small.

For example, if it is assumed that the maximum interval between a plurality of reception units forming array antennas is 20 cm, in the case of measuring an object (transmission unit) that is present 10 m ahead at 2.5-degree accuracy (about 30 cm accuracy), a 6 mm measurement distance difference requires in each reception unit. However, in a radio arrival direction estimating apparatus using actual UWB, as shown in Patent Literature 1, a pulse width is about 2 nsec, which causes error of about 30 cm path length. Therefore, with the configuration as shown in Patent Literature 1, in the case where a plurality of reception units are placed in positions close to each other, it is difficult to estimate the radio wave arrival direction accurately.

In view of the above, it is therefore an object of the present invention to provide a radio arrival direction estimating apparatus and radio arrival direction estimating method for estimating the radio wave arrival direction accurately from a desired tag even in a case where a plurality of antenna elements are placed at short intervals.

Solution to Problem

The radio arrival direction estimating apparatus of the present invention employs a configuration having: an ultra wide band antenna that receives a signal transmitted from a tag; a tag identification detecting section that detects a tag identification from the signal received by the ultra wide band antenna; a timing detecting section that associates and detects a timing the tag identification is detected and a sample timing of an identification bit sequence of the tag identification; an array antenna that is formed with a plurality of antenna elements that receive the signal transmitted from the tag; a calculating section that calculates relative amplitude phase information to indicate a relative amplitude and phase difference between the plurality of antennas, from the signal received by the array antenna; and an arrival direction estimating section that estimates an arrival direction of the signal transmitted from the tag, using a timing associated with the sample timing of the identification bit sequence and the relative amplitude phase information.

The radio arrival direction estimating method of the present invention includes: a tag identification detecting step of detecting a tag identification from a signal which is transmitted from a tag and received by an ultra wide band antenna; a timing detecting step of associating and detecting a timing the tag identification is detected and a sample timing of an identification bit sequence of the tag identification; a calculating step of calculating relative amplitude phase information to indicate a relative amplitude and phase difference between the plurality of antennas, from the signal which is transmitted from the tag and received by an array antenna formed with a plurality of antenna elements; and an arrival direction estimating step of estimating an arrival direction of the signal transmitted from the tag, using a timing associated with the sample timing of the identification bit sequence and the relative amplitude phase information.

Advantageous Effects of Invention

According to the present invention, it is possible to estimate the radio wave arrival direction accurately from a desired tag even in a case where a plurality of antennas are placed at short intervals.

BRIEF DESCRIPTION OF DRAWINGS

FIG. 9 shows relationships between the inter-element distance of array antennas and beam formations according to Embodiment 3 of the present invention;

DESCRIPTION OF EMBODIMENTS

Figure 1:
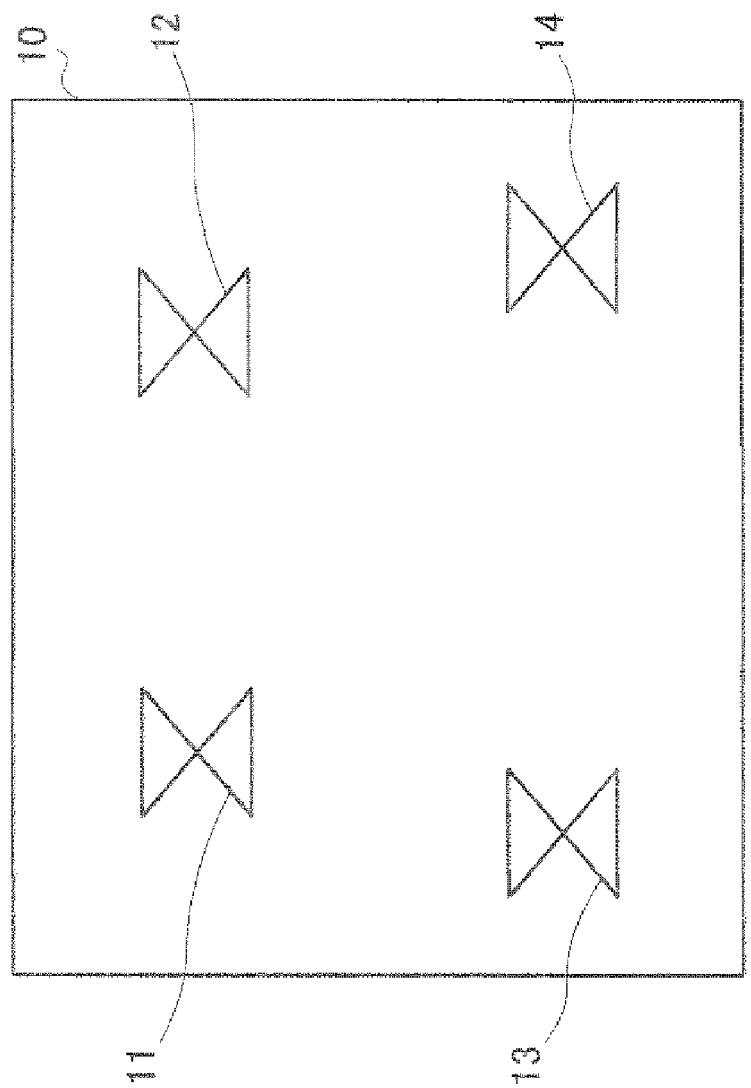
FIG. 1 is a schematic view showing an array configuration of a radio arrival direction estimating apparatus.

Now, embodiments of the present invention will be explained in detail with reference the accompanying drawings. Here, in embodiments, components having the same functions will be assigned the same reference numerals and overlapping explanation will be omitted.

Embodiment 1

Figure 2:
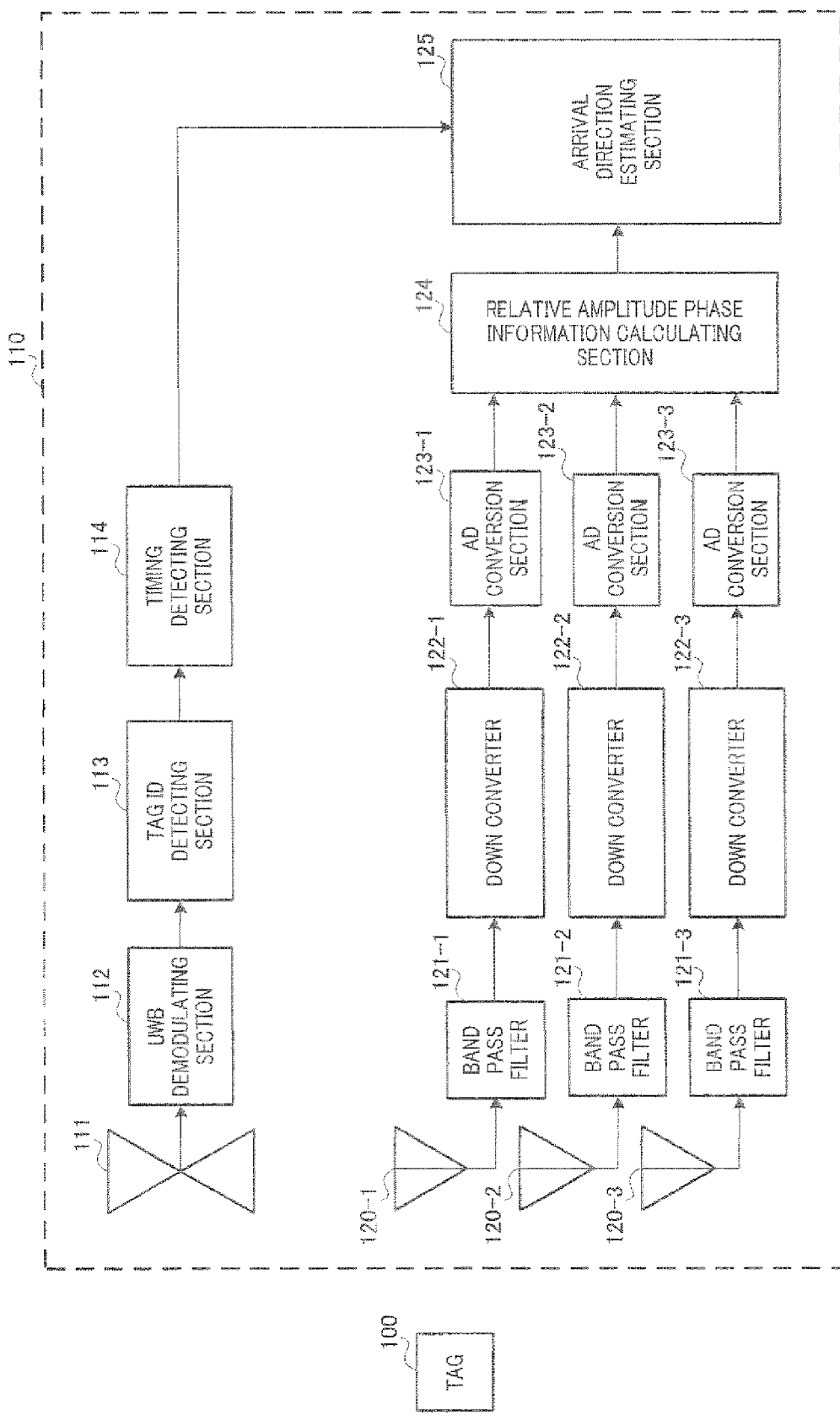
FIG. 2 is a block diagram showing a radio arrival direction estimating apparatus according to Embodiment 1 of the present invention.

FIG. 2 is a block diagram showing a configuration of a radio arrival direction estimating apparatus according to Embodiment 1 of the present invention. In this figure, tag 100 emits an ID assigned to tag 100, to a reader using an IR-UWB signal, in any of an active scheme, passive scheme and semi-passive scheme.

Reader 110 receives the IR-UWB signal emitted from the tag by antenna 111 and outputs the received IR-UWB signal to UWB demodulating section 112.

UWB demodulating section 112 transforms the received IR-UWB signal into a baseband signal and outputs it to a tag ID detecting section. Here, in an impulse-type UWB demodulating section, generally, by performing envelope detection using a diode of good high frequency characteristics, it is possible to obtain a baseband signal.

Tag ID detecting section 113 compares the baseband signal outputted from UWB demodulating section 112 and a plurality of codes of a code sequence (e.g. PN code and GOLD code) determined in advance between the tag and the reader. If they match as a result of comparison, tag ID detecting section 113 recognizes the obtained baseband signal as a desired tag ID. To be more specific, in IR-UWB, a tag ID is transmitted by a signal of a pulse width for about 2 nsec, and, consequently, tag ID detecting section 113 samples tag ID signals at sufficiently high clock speed so as to detect signals with the pulse width of impulse UWB. In the present embodiment, as bits of a bit sequence representing a tag ID, codes "0" and "1" are transmitted using a plurality of UWB pulse sequences, and, consequently, a plurality of pulses are sampled to detect an ID of one bit. Therefore, tag ID detecting section 113 holds the timing each bit ("0" or "1") of the bit sequence representing a tag ID changes and the sample timing of UWB pulses forming each ID, or holds only the timing each bit ("0" or "1") of the bit sequence representing the tag ID changes, and outputs these timings to detecting section 114.

Timing detecting section 114 associates and detects the timings outputted from tag ID detecting section 113 on a per ID bit basis, as reception time.

On the other hand, an IR-UWB signal emitted from the tag is receive in each of antenna elements 120-1 to 120-3. These antenna elements 120-1 to 120-3 form array antennas, and the number of antenna elements is determined from desired accuracy and a desired number of ID detections. Here, a case will be explained where a desired number of ID detections is one and the number of antennas is three assuming that there are stationary reflected waves in addition.

UWB antenna 111 described above is an antenna to receive the overall band signal emitted from the tag, while antenna elements 120-1 to 120-3 are narrowband antennas to perform reception in part of the IR-UWB band. Upon estimating the radio wave arrival direction, as a base principle, the phase difference between antenna systems is the estimation result difference in arrival direction estimation, and, consequently, it is necessary to manage the phase difference between antenna systems within a desired error range by calibration, for example. Therefore, for wideband signals such as a UWB signal, it is necessary to manage the phase accuracy over the wideband, which involves difficulty in realization.

As the simplest example of a narrowband signal, it is possible to use a single continuous wave ("CW") signal included in an IR-UWB signal. A UWB signal in the IR-UWB scheme is generated by passing an edge signal of frequency oscillated in a crystal oscillation circuit on the transmitting side through a band-pass filter. For example, when the crystal oscillator frequency is 10 MHz, it is considered that an IR-UWB signal is the signal in which CW is arranged at 10 MHz intervals in the UWB lower band of 3.4 to 4.8 GHz or in the UWB upper band of 7.25 to 10.6 GHz. Therefore, with the present embodiment, for example, it is possible to use an IR-UWB signal as 4 GHz or 8 GHz CW and set the center frequency of each antenna element of array antennas to 4 GHz or 8 GHz frequency.

Signals received in the antenna elements are subjected to interference cancellation by passing through band-pass filters 121-1 to 121-3 and then converted to IF signals or IQ baseband signals in down-converters 122-1 to 122-3. As an IF signal, there is a 10 MHz IF signal, for example. In this case, a local signal is the signal of upstream 4 GHz/8 GHz or downstream 10 MHz, and it is desirable to use an image rejection mixer to remove a close image. If the above signals are converted into IQ baseband signals, there is no image signal, and therefore adjacent CW signals are cut by a baseband filter of about 5 MHz cutoff frequency.

The IF signals or IQ baseband signals generated in down-converters 122-1 to 122-3 are received as input in AD conversion sections 123-1 to 123-3, converted into digital signals and then received as input in relative amplitude phase information calculating section 124.

Relative amplitude phase information calculating section 124 calculates a correlation matrix or covariance matrix for the input signal of each antenna every sample, using the digital signals outputted from AD conversion sections 123-1 to 123-3. In the case where pulses are provided in IR-UWB of the OOK (On-Off-Keying) scheme, signals have DC components, so that a covariance matrix made by subtracting average signal components from a correlation matrix is generally calculated. Also, in the case where pulses are provided in IR-UWB of the biphase scheme, signals do no have DC components, so that a correlation matrix may be generally used. The correlation matrix or covariance matrix is accumulated in a memory in relative amplitude phase information calculating section 124.

Arrival direction estimating section 125 estimates the radio wave arrival direction using the correlation matrix or covariance matrix accumulated in relative amplitude phase information calculating section 124 and the timing outputted from timing detecting section 114. Arrival direction estimating section 125 will be explained below in detail.

Figure 3:
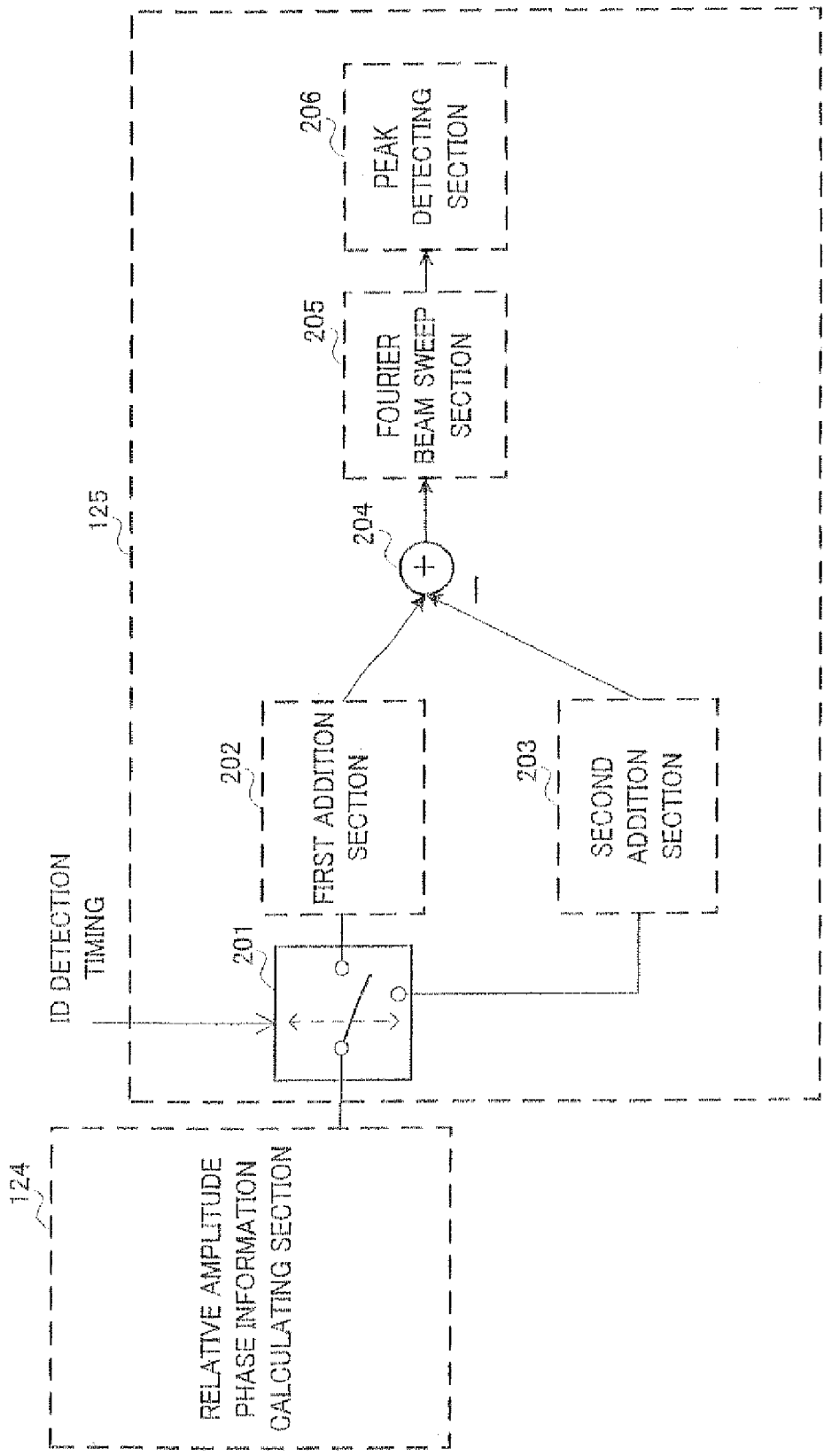
FIG. 3 is a block diagram showing a configuration inside an arrival direction estimating section shown in FIG. 2.

FIG. 3 is a block diagram showing a configuration inside arrival direction estimating section 125 shown in FIG. 2. Here, a reference clock is shared in the same case of reader 110, and assume that an ID detection timing outputted from timing detecting section 114 is given to switch 201 as an address value of a counter or memory for the clock. Arrival direction estimating section 125 obtains relative amplitude phase information associated with one of digital values "1" and "0" of a tag ID.

Therefore, in first addition section 202 that adds relative amplitude phase information associated with digital value "1" of the tag ID every matrix element and second addition section 203 that adds relative amplitude phase information associated with digital value "0" of the tag ID every matrix element, one relative amplitude phase information is formed every unit period (i.e. bit period in which one bit of a tag ID generated from a plurality of UWB pulses is transmitted).

If there is only one tag, in the case of an OOK signal, calculator 204 subtracts the relative amplitude phase information generated in second addition section 203 from the relative amplitude phase information generated in first addition section 202, and extracts a signal associated with a digital value "1" phase. Here, information associated with digital value "1" includes an arrival signal from a tag (i.e. signal representing bit "1" included in a bit sequence representing a tag ID) and noise components such as reflective waves from others than the tag. In contrast, information associated with digital value "0" represents unnecessary signals (noise components) including reflective waves from others than the tag ID. Therefore, as described above, by subtracting information associated with digital value "0" from information associated with digital value "1," it is possible to remove reflective wave signals from others than the tag with a simple configuration and improve the accuracy of estimating the radio wave arrival direction from the tag.

Also, the phase of a biphase signal is reversed and then added, and, consequently, phases are combined in-phase. Fourier beam sweep section 205 sweeps the Fourier beam with respect to azimuth angle or elevation angle using that relative amplitude phase information, thereby obtaining the arrival direction distribution as signal intensity. Peak detecting section 206 can detect the radio wave arrival direction by obtaining the peak value of the signal intensity of that azimuth spectral signal.

Figure 4A:
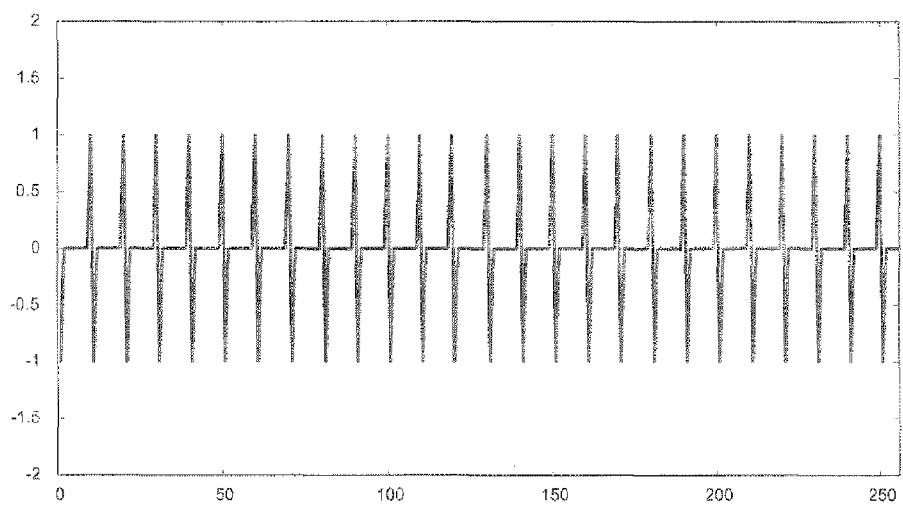
FIG. 4 shows examples of specific processing timing in a radio arrival direction estimating apparatus.

Next, an example of specific processing timing in a radio arrival direction estimating apparatus will be explained using FIG. 4. In FIG. 4, the horizontal axis represents the sample timing, and the vertical axis represents the intensity of signals received in antenna elements 120-1 to 120-3 at each sample timing. FIG. 4A shows a waveform in antennas 120-1 to 120-3, where a periodic impulse signal is transmitted from reader 110 in a passive scheme or semi-passive scheme, a reflective wave comes from the 30-degree direction in response to the transmission and this reflective wave is received. Here, the 30-degree direction is the angle formed by the straight line on which antennas 120-1 to 120-3 are placed and the normal direction.

In the case of the passive scheme or semi-passive scheme, reader 110 transmits area broadcast information equivalent to a wireless LAN beacon from the side of reader 110. In the case of IR-UWB, an impulse signal of regular period about 10 MHz is transmitted. In view of the UWB characteristics, the pulse signal has a pulse width of about 2 nsec.

In an actual radio wave propagation environment, there are many cases where furniture and fixtures such as a wall and desk are placed near reader 110, and a pulse waveform from reader 110 is reflected and returned as is from a wall and so forth to reader 110. Therefore, the array antenna of reader 110 receives unnecessary reflective wave pulses. In this case, the phase of the signal of each antenna element of array antennas varies depending on the path length difference between the antenna element and a wall with respect to each frequency component of a wideband pulse. For example, in array antennas designed with ½ wavelength element intervals in the case of adopting 4 GHz, although a signal from the 30-degree direction comes to the antenna elements with ¼ wavelength phase difference, a phase difference occurs by about 25% in 3 GHz or 5 GHz. With the present invention, an impulse signal is down-converted and used as a narrowband signal, and therefore that difference does not occur.

Figure 4B:
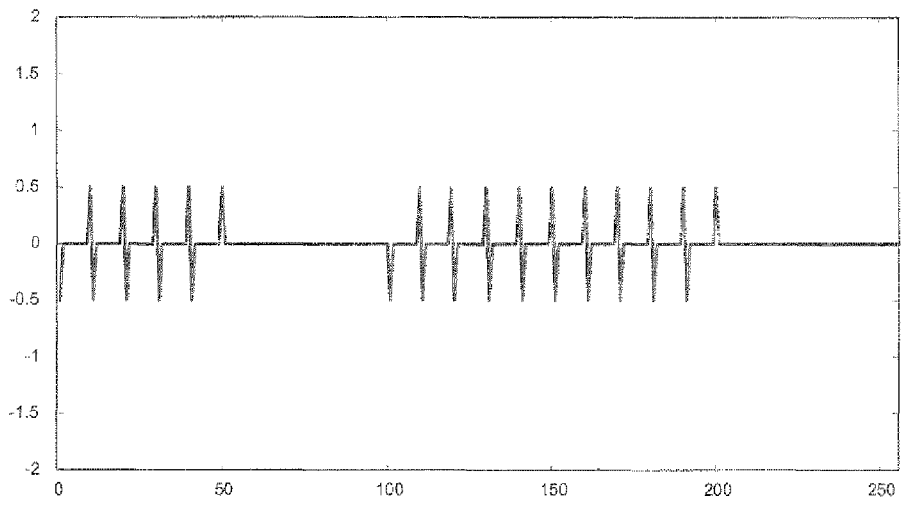

FIG. 4B shows a waveform in antennas 120-1 to 120-3 in a case where tag 100 that is present in the −30-degree direction attaches an ID to a passive scheme impulse signal from reader 110 and reader 110 receives the signal attached the ID. Here, the −30-degree direction is an angle formed by the straight line on which antennas 120-1 to 120-3 are placed and the normal direction. FIG. 4 shows an example where, although the horizontal axis represents the sample timing, tag 100 returns ID bits in units of 50 samples in response to periodic pulses from reader 110.

FIG. 4B shows a state of transmitting code "1" from 0th to 50th samples, code "0" from 51st to 100 samples, code "1" from 101st to 150th samples, code "1" from 151st to 200th samples, and code "0" from 201st to 256th samples. Here, an example is shown where a signal from tag 100 is received by array antennas with ½ amplitude of that of FIG. 4A so that amplitudes are compared between FIG. 4A and FIG. 4B. In this case, similarly, the phase of the signal of each antenna element of array antennas varies depending on the path length difference between the reader antenna element and a wall with respect to each frequency component of a wideband pulse. For example, in array antennas designed with ½ wavelength element intervals in the case of adopting 4 GHz, although a signal from the 30-degree direction comes to the antenna elements with ¼ wavelength phase difference, a phase difference occurs by about 25% in 3 GHz or 5 GHz. With the present invention, an impulse signal is down-converted and used as a narrowband signal, and therefore that difference does not occur.

Figure 4C:
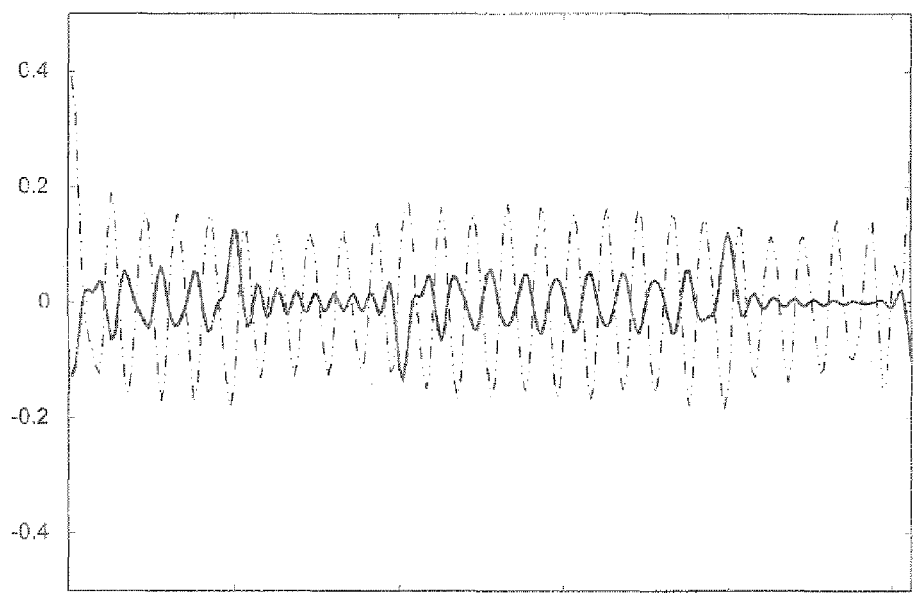

FIG. 4C shows an IF signal or IQ baseband signal of down-converter output in a case where the signal shown in FIG. 4A and the signal shown in FIG. 4B are combined. As shown in FIG. 4C, the signal is down-converted to a pulse occurrence period (e.g. 10 MHz), and therefore two signals are combined. Then, the phase of the combined signal is observed as the amplitude of the I signal (solid line) and the amplitude of the Q signal (wavy line). Here, an example is shown where tag 100 returns ID bits in units of 50 samples for periodic pulses from reader 110. That is, it is possible to identify transmission of code "1" from 0th to 50th samples, code "0" from 51st to 100th samples, code "1" from 101st to 150th samples, code "1" from 151st to 200th samples, and code "0" from 201st to 256th samples, by an ID detection timing signal obtained from timing detecting section 114.

Here, in the case of code. "0," an arrival signal from the tag is not included but only a reflective wave is included, and, in the case of code "1," an arrival signal from the tag and a reflective wave are included. Therefore, as relative amplitude phase information in the case of code "0," a covariance matrix is derived from a plurality of items of sample data (data of 50 samples in the above example) sampled at the intra-code timing of ID bits of code "0." Also, as relative amplitude phase information in the case of code "1," a covariance matrix is derived from a plurality of items of sample data (data of 50 samples in the above example) sampled at the intra-code timing of ID bits of code "1." The number of items of relative amplitude phase information in the case of code "0" and the number of items of relative amplitude phase information in the case of code "1" are the same. If the number of antennas is three, as a result, a covariance matrix obtained as a matrix of three rows and three columns is derived. Next, for each of codes "0" and "1," the covariance matrixes corresponding to each code are added, and, after the addition result in the case of code "0" is subtracted from the addition result in the case of code "1," the radio waveform arrival direction is detected by peak detection and the Fourier beam generated using resulting one covariance matrix of three rows and three columns. Here, although a covariance matrix is used as relative amplitude phase information, it is equally possible to use other matrixes than a covariance matrix as long as it is possible to detect information about the phase difference between antenna elements. Also, although a case has been described where relative amplitude phase information is detected using signals in all intervals of 50 samples of code "0" or code "1," it is equally possible to calculate relative amplitude phase information using samples in part of the intervals of each code not to make phases discontinue at the boundary of switching the codes.

Figure 5A:
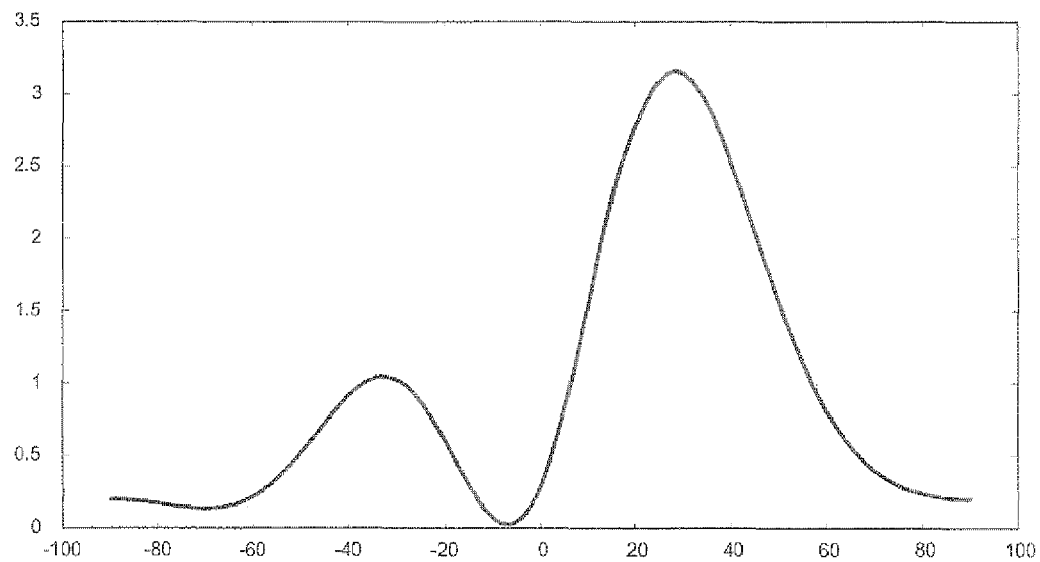
FIG. 5 shows radio arrival direction estimation results.

Next, FIG. 5A shows output results of Fourier beam sweep section 205 in a case where a covariance matrix is not identified by ID when the signal shown in FIG. 4A and the signal shown in FIG. 4B are combined. The horizontal axis in FIG. 5 represents the estimated azimuth (in the horizontal plane) angle (unit: degree), and the vertical axis represents the signal intensity at each angle. In this case, unlike the operations of the present invention, a result is shown where a Fourier beam is calculated using a covariance matrix derived from each sample timing between 0th and 256th samples. Here, a Fourier beam refers to a scheme of correcting the relative phase difference of array element reception signals presumed in the estimated azimuth direction for reception signals while these reception signals are added over all antenna elements. If a signal comes from the estimated azimuth direction, reception signals are added in-phase, so that the signal intensity is maximized. By sweeping the estimated azimuth angle from −90 degrees to 90 degrees or from −180 degrees to 180 degrees, the direction in which a received addition signal becomes maximum, is estimated as the arrival direction. By calculating a covariance matrix, the relative amplitude and phase between antenna phases are calculated, so that it is possible to estimate the direction by the Fourier beam.

As seen from FIG. 5A, in this case, an arrival signal is not identified by a tag, and, consequently, the Fourier beam has peaks in two directions of −30 degrees of the tag direction and 30 degrees of the wall surface reflective wave direction. Also, the wall surface reflective wave is stronger than the tag, and, consequently, the maximum peak occurs in the wall surface reflection direction and detection error occurs.

Figure 5B:
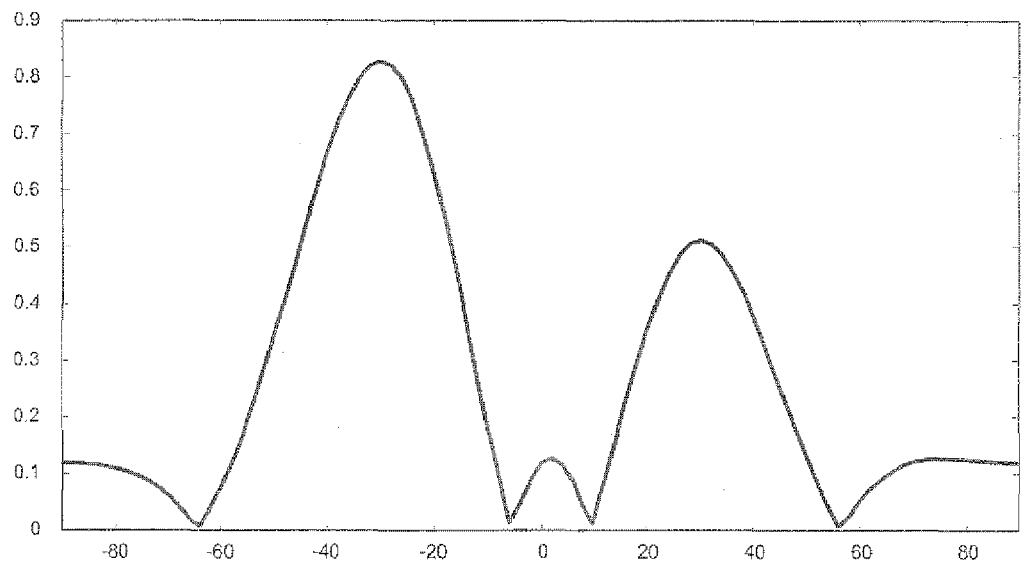

By contrast with this, FIG. 5B shows an output result of Fourier beam sweep section 205 in the case of using arrival direction estimating section 124 of FIG. 3. As described above, by subtracting the addition result of relative amplitude phase information in the case of code "0" from relative amplitude phase information in the case of code "1," the reflective wave components are reduced and have a weaker influence, so that the maximum peak is obtained in the tag direction.

Thus, according to Embodiment 1, a reader of the IR-UWB scheme down-converts a reception signal into a narrowband signal while estimating the radio weave arrival direction using relative amplitude phase information at the timing a specific tag ID is detected, so that it is possible to estimate the radio wave arrival direction accurately even in a reader in which the interval between a plurality of antenna elements forming array antennas is about one wavelength.

Also, although only an influence of wall surface reflection is shown in a passive scheme and semi-passive scheme with the present embodiment, it is equally possible to estimate the radio wave arrival direction at the timing a specific tag ID is detected, for an influence of interference and multiple waves of a plurality of tags.

Also, although a case has been described above with the present embodiment where array antennas are formed with three antenna elements, the number of antenna elements is not limited as long as this number is equal to or greater than 2. Also, array antennas may be formed using other array shapes such as a linear array, circular array (including an unequal interval array) and V-type formation. Also, it is equally possible to use a UWB antenna for ID detection as part of array antennas.

Embodiment 2

Figure 6:
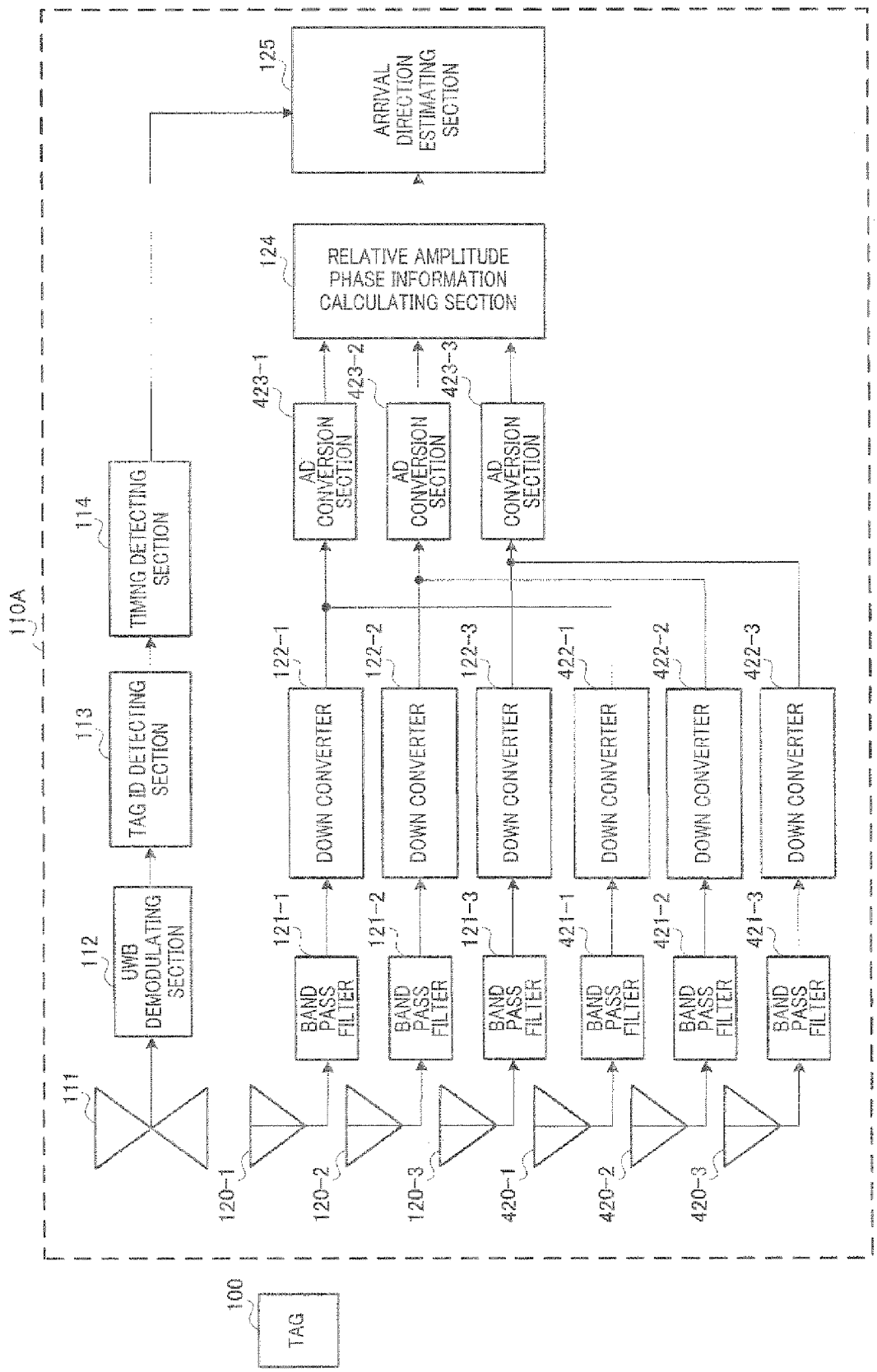
FIG. 6 is a block diagram showing a configuration of a radio arrival direction estimating apparatus according to Embodiment 2 of the present invention.

FIG. 6 is a block diagram showing a configuration of radio arrival direction estimating apparatus 110 according to Embodiment 2 of the present invention. FIG. 6 differs from FIG. 2 in adding antennas 420-1 to 420-3, band-pass filters 421-1 to 421-3 and down-converters 422-1 to 422-3 and changing AD conversion sections 123-1 to 123-3 to AD conversion sections 423-1 to 423-3.

Antennas 420-1 to 420-3 receive band signals different from UWB bands in which antennas 120-1 to 120-3 perform reception. Similarly, band-pass filters 421-1 to 421-3 and down-converters 422-1 to 422-3 process different band pass signals from those of band-pass filters 121-1 to 121-3 and down-converters 122-1 to 122-3.

AD conversion sections 423-1 to 423-3 select the signals of the better reception level between two kinds of narrowband signals including signals outputted from down-converters 122-1 to 122-3 and signals outputted from down-converters 422-1 to 422-3, or combine these two kinds of narrowband signals and perform AD conversion.

Thus, according to Embodiment 2, by receiving a plurality of band signals in a reader, even in a case where the reception level degrades in part of the bands due to fading, if the fading frequency correlation of other frequency band signals is low, it is possible to receive signals with sufficiently high reception level and maintain high estimation accuracy of the arrival direction.

Also, although two kinds of narrowband signals of UWB are used in the present embodiment, it is equally possible to use three or more kinds of narrowband signals.

Embodiment 3

Figure 7:
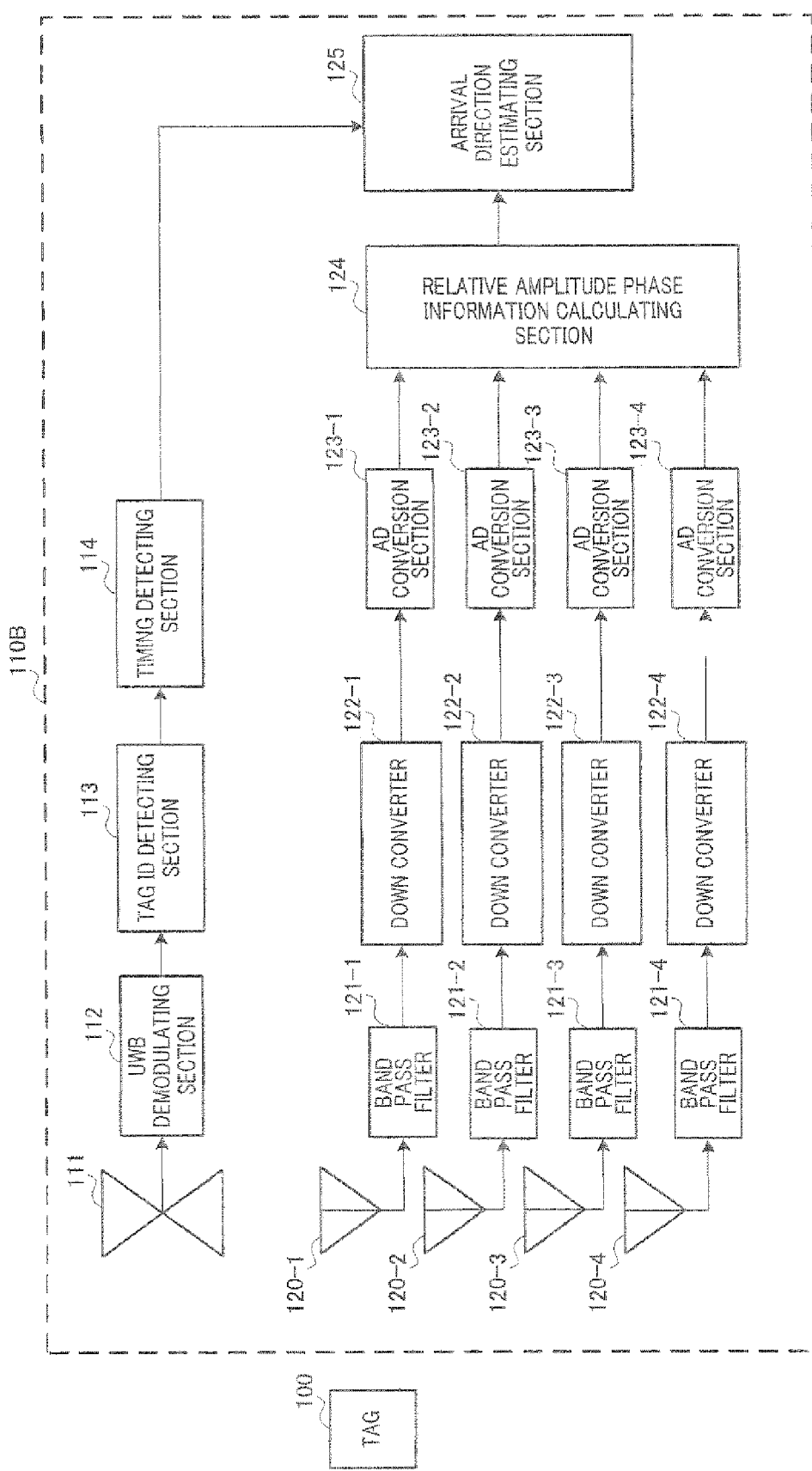
FIG. 7 is a block diagram showing a configuration of a radio arrival direction estimating apparatus according to Embodiment 3 of the present invention.

FIG. 7 is a block diagram showing a configuration of radio arrival direction estimating apparatus 110B according to Embodiment 3 of the present invention. FIG. 7 differs from FIG. 2 in adding antenna element 120-4, band-pass filter 121-4, down-converter 122-4 and AD converter 123-4. That is, radio arrival direction estimating apparatus 110B has four antenna elements forming array antennas used to estimate the radio wave arrival direction. Also, relative amplitude phase information calculating section 124 calculates a correlation matrix or covariance matrix for the input signal of each antenna element every sample, using digital signals outputted from AD conversion sections 123-1 to 123-4.

Figure 8:
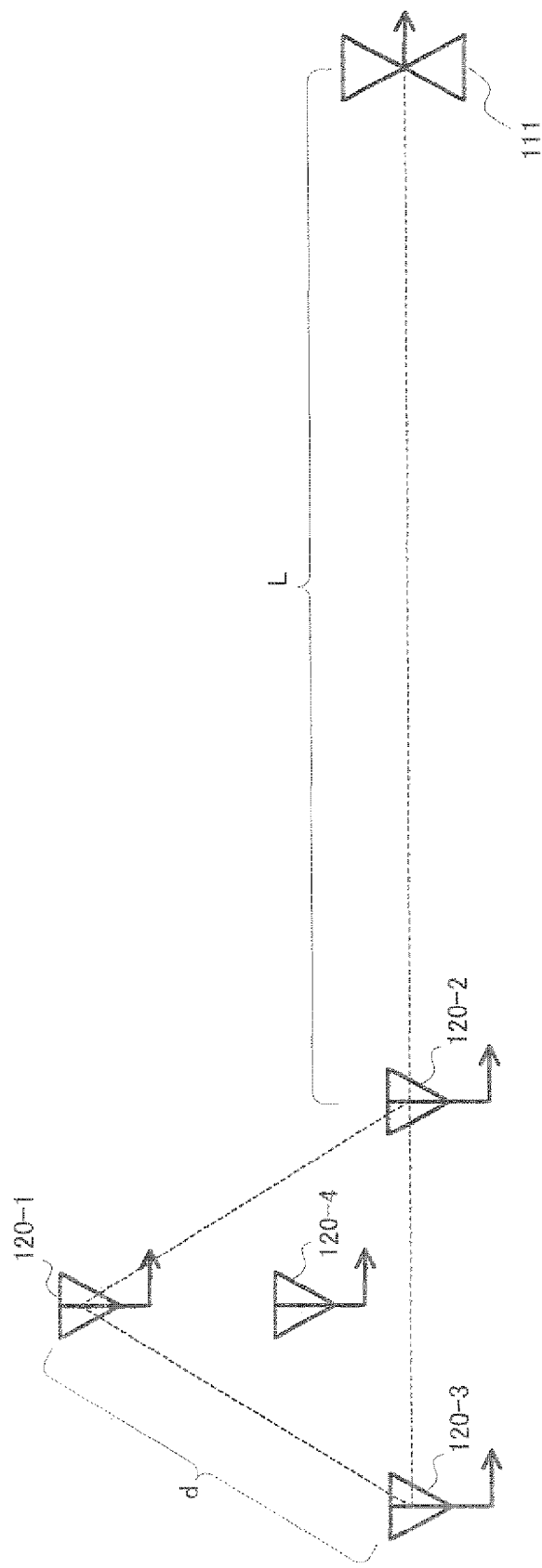
FIG. 8 shows an example of the overall configuration of an antenna part according to Embodiment 3 of the present invention.

Also, FIG. 8 shows a placement example in the overall antenna part including array antennas formed with antenna elements 120-1 to 120-4 and UWB antenna 111.

In FIG. 8, antenna elements 120-1 to 120-3 are placed in the vertices of a regular triangle having length "d" per side. Then, antenna element 120-4 is placed in the centroid of the regular triangle. Also, in FIG. 8, UWB antenna 111 is placed distance L apart from the most closest antenna element to UWB antenna 111 (antenna element 120-2 in FIG. 8) among the three antenna elements placed in the vertices of the regular triangle.

Here, inter-antenna-element distance d between antenna elements 120-1 to 120-3, and separation distance D between antenna element 120-2 and UWB antenna 111, are determined as follows, based on the frequency of IR-UWB signal and the center frequency of each antenna element 120. Here, IR-UWB signal is used as 4 GHz or 8 GHz CW, and the center frequency of each antenna element 120 of array antennas is set to 4 GHz or 8 GHz frequency.

In radio arrival direction estimating apparatus 110B, it is desirable to set inter-element distance d of antenna elements 120 forming the array antenna circumference in the range of 0.36 to 0.44$\lambda$ or 0.72 to 0.88$\lambda$. Here, $\lambda$, which is a unit of d, represents a wavelength calculated from light speed (~2.998× 10^8 m/s) and center frequency f.

FIG. 9 shows a directional beam formation in a case where array antennas are subjected to equal-amplitude oscillation. FIGS. 9A to 9F show directional beam formations in respective inter-element distances d. Inter-element distances d in FIGS. 9A to 9F are 0.4$\lambda$, 0.5$\lambda$, 0.3$\lambda$, 0.7$\lambda$, 0.8$\lambda$, and 0.9$\lambda$, respectively. In FIG. 9, the horizontal axis represents the horizontal-plane (azimuth) angle, and the vertical axis represents the directive gain of array antennas normalized by the maximum value.

In comparison between FIG. 9A and FIG. 9B, it is recognized in FIG. 9B that the side lobes on the ±180 degree directions become higher with respect to the main beam in the 0 degree direction. Also, in comparison between FIG. 9A and FIG. 9C, it is recognized that the main beam width in FIG. 9C becomes wider than FIG. 9A.

If the side lobe increases like FIG. 9B, it is difficult to separate two arrival waves with a level difference. For example, in the case of FIG. 9B, the side lobe is about −4 dB from the main beam. Therefore, if there is a level difference equal to or greater than 4 dB between two arrival waves, it is not possible to separately estimate the arrival directions of those two waves. Also, if the main beam becomes wider like FIG. 9C, an influence of receiver noise is likely to occur, and, consequently, even in a case where there is only one arrival wave, the accuracy of estimation in the arrival direction degrades.

Also, as seen from FIG. 9D to FIG. 9F, there is a trend that, when d becomes longer, the main beam in the 0 degree direction becomes sharp while the side lobe rises. As described above, the main beam width and the side lobe level influence the accuracy of arrival direction estimation, and, consequently, it is necessary to set the optimal inter-element distance d taking into account, for example, the use environment of radio arrival direction estimating apparatus 110B. Further, in antenna elements, electromagnetic mutual coupling occurs depending on the separation distance between antenna elements. This mutual coupling distorts the antenna element directive pattern and reduces the radiation efficiency of antennas. Therefore, preferable industrial products are provided by configuring radio arrival direction estimating apparatus 110B such that the separation distance between antenna elements becomes large to suppress mutual coupling. That is, it is often useful by employing a configuration corresponding to a theoretical analysis result even if the overall size of the antenna part becomes large more or less in radio arrival direction estimating apparatus 110B.

Therefore, in array antennas for arrival direction estimation formed as in FIG. 8, inter-element distance d between antenna elements 120-1 to 120-3 forming the circumference are parameters determined by tradeoff between separation performance of two arrival waves and estimation accuracy of one arrival wave. Taking into account these conditions, in radio arrival direction estimating apparatus 110B according to the present embodiment, inter-element distance d is preferably near 0.4$\lambda$ or 0.8$\lambda$. To be more specific, if the center frequency of IR-UWB signal is used as, for example, 4 GHz, d is about 30 mm in the case of 0.4$\lambda$ or about 60 mm in the case of 0.8$\lambda$. Also, if the center frequency of IR-UWB signal is used as, for example, 8 GHz, d is about 15 mm in the case of 0.4$\lambda$ or about 30 mm in the case of 0.8$\lambda$.

Also, likewise, it is preferable that above-noted separation distance L is equal to or greater than 1 in wavelength units. This is a reference separation distance to make the mutual coupling level between antennas equal to or less than −30 dB. For example, Non-Patent Literature 2 discloses relationships between separation distance and mutual coupling level of two microstrip antennas. When this mutual coupling level increases, distortion occurs in the directivities of two antennas subject to mutual coupling, which degrades the accuracy of arrival direction estimation or the reception sensitivity of IR-UWB.

As described above, according to the present embodiment, in radio arrival direction estimating apparatus 110B, antenna elements 120-1 to 120-3 are placed in the vertices of a regular triangle, and antenna element 120-4 is placed in the centroid of the regular triangle.

By this means, the symmetry of array antennas improves, so that it is possible to realize array antennas that can receive signals from any direction in a balanced manner.

To be more specific, when the reception signal wavelength of radio arrival direction estimating apparatus 110 B is $\lambda$, the length per side of the regular triangle, d, is preferably within a range of 0.36 to 0.44$\lambda$, or 0.72 to 0.88$\lambda$. Also, separation distance L between UWB antenna 111 and antenna element 120-2 closest to UWB antenna 111 among antenna elements 120-1 to 120-3, is preferably equal to or greater than 1$\lambda$.

By this means, it is possible to suppress the side lobe level while maintaining the sharpness of the main beam at a certain level, so that it is possible to improve the reception sensitivity of array antennas. As a result, it is possible to improve the accuracy of arrival direction estimation in radio arrival direction estimating apparatus 110B.

Also, monopole antennas, sleeve dipole antennas or microstrip antennas are suitable in particular as antenna elements 120-1 to 120-4, the present invention is not limited to these. Also, by placing antenna elements 120-1 to 120-3 on the ground plane as monopole antennas or sleeve dipole antennas or by using antenna elements 120-1 to 120-3 as microstrip antennas, it is possible to perform three-dimensional arrival direction estimation with respect to the hemisphere face above the ground plane in radio arrival direction estimating apparatus 110B.

Embodiment 4

Figure 10:
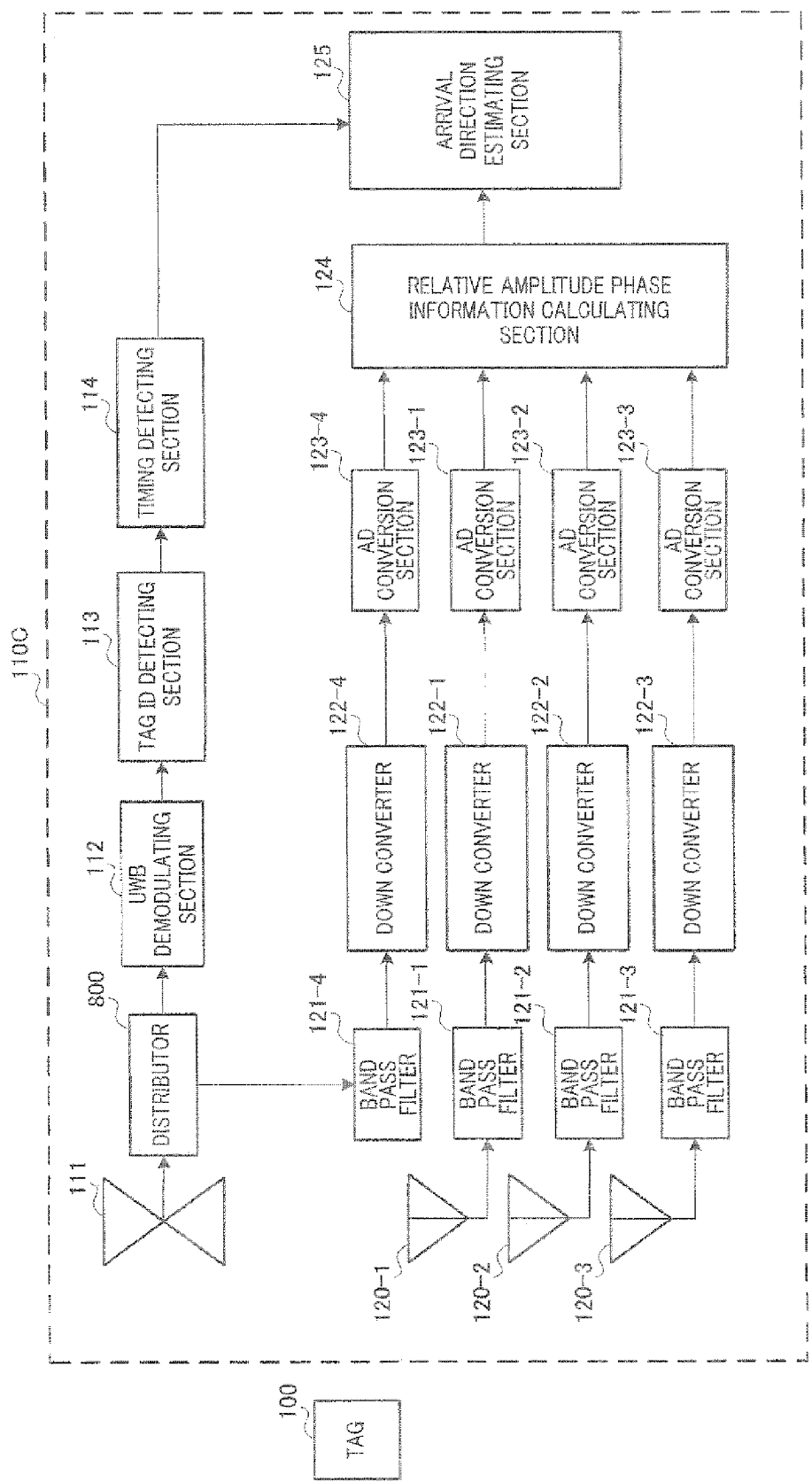
FIG. 10 is a block diagram showing a configuration of a radio arrival direction estimating apparatus according to Embodiment 4 of the present invention.

FIG. 10 is a block diagram showing a configuration of radio arrival direction estimating apparatus 100C according to Embodiment 4 of the present invention. FIG. 10 differs from FIG. 7 in providing distributor 800 after UWB antenna 111 and sharing UWB antenna 111 as one of antenna elements forming array antennas used for arrival direction estimation. That is, after reception signals of UWB antenna 111 are distributed into two using distributor 800, one is received as input in UWB demodulating section 112, and the other is received as input in band-pass filter 121-4 for arrival direction estimation. Also, relative amplitude phase information calculating section 124 calculates a correlation matrix or covariance matrix for the input signal of each antenna element every sample, using digital signals outputted from AD conversion sections 123-1 to 123-4.

Figure 11:
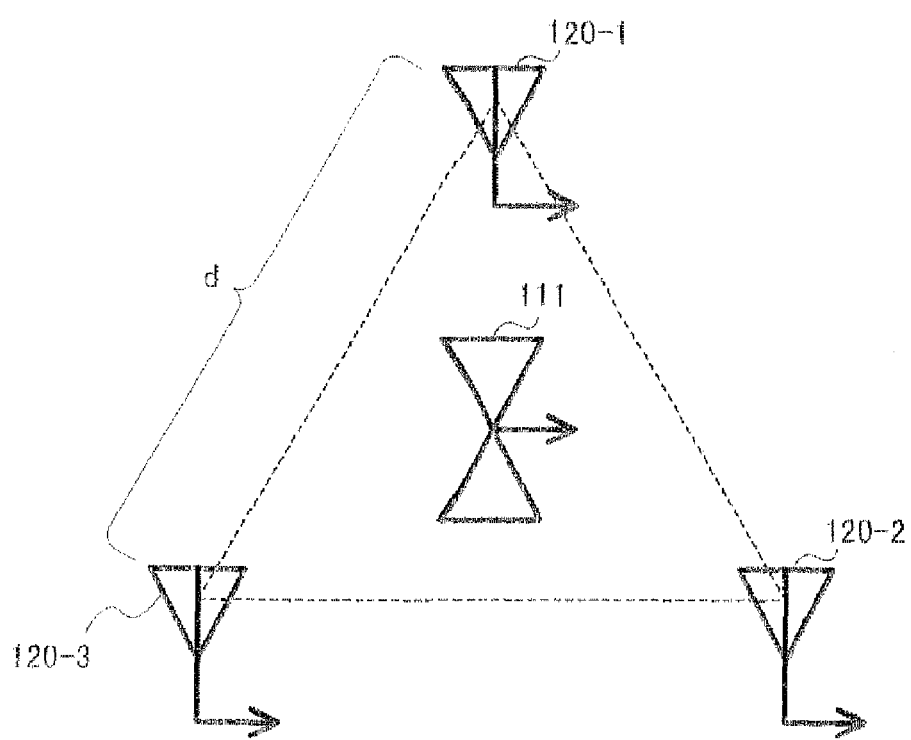
FIG. 11 shows an example of the overall configuration an antenna part according to Embodiment 4 of the present invention.

FIG. 11 shows a configuration example of an antenna part formed with antenna elements 120-1 to 120-3. Similar to Embodiment 3, in FIG. 11, antenna elements 120-1 to 120-3 are placed in the vertices of a regular triangle having length "d" per side. Then, in Embodiment 4, UWB antenna 111 is placed in the centroid of the regular triangle. That is, UWB antenna 111 is placed in the centroid and shared as one of antenna elements of array antennas. Therefore, by setting inter-element distance d around 0.4λ, it is possible to realize array antennas with the same beam formation as in FIG. 9A.

As described above, according to the present embodiment, in radio arrival direction estimating apparatus 110C, antenna elements 120-1 to 120-3 are placed in the vertices of a regular triangle, UWB antenna 111 is placed in the centroid of the regular triangle, and relative amplitude phase information calculating section 124 calculates relative amplitude phase information representing the relative amplitude and phase difference between antenna elements, from signals received in antenna elements 120-1 to 120-3 and UWB antenna 111.

By this means, antenna elements 120-1 to 120-3 and UWB antenna 111 form array antennas, which improves the symmetry of these array antennas, so that it is possible to realize array antennas that can receive signals from any direction in a balanced manner.

Also, a case has been described above where UWB antenna 111 is used as one of antenna elements forming array antennas. By contrast with this, in radio arrival direction estimating apparatus 110 according to Embodiment 1, it is equally possible to place UWB antenna 111 in the centroid of the regular triangle in which antenna elements 120-1 to 120-3 are placed. That is, in this case, UWB antenna 111 merely functions as an antenna that receives the overall band signal emitted from a tag, and is not shared as one of antenna elements forming the array antennas for arrival direction estimation.

Also, monopole antennas, sleeve dipole antennas or microstrip antennas are suitable in particular as antenna elements 120-1 to 120-3, the present invention is not limited to these. Also, by placing antenna elements 120-1 to 120-3 on the ground plane as monopole antennas or sleeve dipole antennas or by using antenna elements 120-1 to 120-3 as microstrip antennas, it is possible to perform three-dimensional arrival direction estimation with respect to the hemisphere face above the ground plane in radio arrival direction estimating apparatus 110C.

The disclosures of Japanese Patent Application No. 2008-253659, filed on Sep. 30, 2008, and Japanese Patent Application No. 2009-116829, filed on May 13, 2009, including the specifications, drawings and abstracts, are incorporated herein by reference in their entireties.

INDUSTRIAL APPLICABILITY

The radio arrival direction estimating apparatus and radio arrival direction estimating method according to the present invention are useful in, for example, a radio tag system providing a reader/writer and radio tag.

The invention claimed is:

1. A radio arrival direction estimating apparatus comprising:
   an ultra wide band antenna that receives a signal transmitted from a tag;
   a tag identification detecting section that detects a tag identification from the signal received by the ultra wide band antenna;
   a timing detecting section that associates and detects a timing the tag identification is detected and a sample timing of an identification bit sequence of the tag identification;
   an array antenna that is formed with a plurality of antenna elements that receive the signal transmitted from the tag;
   a calculating section that calculates relative amplitude phase information to indicate a relative amplitude and phase difference between the plurality of antennas, from the signal received by the array antenna; and
   an arrival direction estimating section that estimates an arrival direction of the signal transmitted from the tag, using a timing associated with the sample timing of the identification bit sequence and the relative amplitude phase information.

2. The radio arrival direction estimating apparatus according to claim 1, wherein the arrival direction estimating section comprises:
   a first addition section that adds relative amplitude phase information generated using a plurality of items of sample data sampled at a timing associated with bit 1 of the identification bit sequence;
   a second addition section that adds relative amplitude phase information generated using a plurality of items of sample data sampled at a timing associated with bit 0 of the identification bit sequence;
   an operating section that subtracts the relative amplitude phase information added in the second addition section from the relative amplitude phase information added in the first addition section;
   a Fourier beam sweep section calculates an angle spectrum by sweeping a Fourier beam using a subtraction result in the operating section; and
   a peak detecting section that detects a peak of the angle spectrum.

3. The radio arrival direction estimating apparatus according to claim 1, wherein the plurality of antenna elements receive a narrower hand signal than the signal received in the ultra wide band antenna.

4. The radio arrival direction estimating apparatus according to claim 1, wherein the calculating section calculates a correlation matrix or covariance matrix from the received signal, as the relative amplitude phase information.

5. The radio arrival direction estimating apparatus according to claim 1, wherein the array antenna comprises:
   a plurality of first antenna elements having a first center frequency; and
   a plurality of second antenna elements having a second center frequency different from the first center frequency.

6. The radio arrival direction estimating apparatus according to claim 5, further comprising a switching and combining section that switches or combines reception signals received in the plurality of first antenna elements and reception signals received in the plurality of second antenna elements.

7. The radio arrival direction estimating apparatus according to claim 1, wherein the plurality of antenna elements are comprised of first to third antenna elements placed in vertices of a regular triangle and a fourth antenna element placed in a centroid of the regular triangle.

8. The radio arrival direction estimating apparatus according to claim 1, wherein:
   the plurality of antenna elements are comprised of first to third antenna elements placed in vertices of a regular triangle; and
   the ultra wide band antenna is placed in a centroid of the regular triangle.

9. A radio arrival direction estimating method comprising:
   a tag identification detecting step of detecting a tag identification from a signal which is transmitted from a tag and received by an ultra wide band antenna;
   a timing detecting step of associating and detecting a timing the tag identification is detected and a sample timing of an identification bit sequence of the tag identification;
   a calculating step of calculating relative amplitude phase information to indicate a relative amplitude and phase difference between the plurality of antennas, from the signal which is transmitted from the tag and received by an array antenna formed with a plurality of antenna elements; and
   an arrival direction estimating step of estimating an arrival direction of the signal transmitted from the tag, using a timing associated with the sample timing of the identification bit sequence and the relative amplitude phase information.

* * * * *